June 12, 1945.  L. DEWAN  2,378,201
PRESSURE GAUGE
Filed June 16, 1943  2 Sheets-Sheet 1

INVENTOR
Leon Dewan
BY Edw. S. Higgins
ATTORNEY

June 12, 1945.　　　　L. DEWAN　　　　2,378,201
PRESSURE GAUGE
Filed June 16, 1943　　　2 Sheets-Sheet 2

INVENTOR
Leon Dewan
BY Edw. S. Higgins
ATTORNEY

Patented June 12, 1945

2,378,201

UNITED STATES PATENT OFFICE 2,378,201

PRESSURE GAUGE

Leon Dewan, Arverne, N. Y., assignor of one-half to Percival W. Andrews, New York, N. Y.

Application June 16, 1943, Serial No. 490,980

6 Claims. (Cl. 73—414)

This invention relates generally to improvements in pressure-gauges particularly to the Bourdon type.

An object is to reduce the effect of vibration on such gauges whether it comes from an external source or from sudden irregularities in the pressure of the metered fluid.

Another object is to eliminate wear on the moving parts of the gauge.

According to the present invention, the pressure responsive element such as a Bourdon tube has one of its extremities connected to a pivoted gear segment by linkage, one end of the linkage extending to one side of the pivot and being fastened to the periphery of the gear segment, the other end of the linkage which extends on the other side of the pivot being connected directly to the extremity of the tube and receiving the motion of the tube. The motion of the tube is thus transmitted through a reversed path whereby unusual and extraordinary flexure is applied to the linkage against any resistance, such as inertia of the gear segment when the applied motion is of high speed. The linkage has a certain amount of flexibility, depending upon the inertia of the gear segment, but at the same time it is sufficiently rigid so that pressure changes occurring at normal speed are accurately and normally transmitted as though the flexible linkage and gear segment were of one piece. However, with increase of speed in the motion, such as when the Bourdon tube vibrates, the linkage flexes in proportion to the velocity of the motion against the inertia of the gear segment.

The linkage is bent to contact the surface of the segment and to produce a certain amount of frictional resistance to independent motion between the linkage and segment due to linkage flexure. This helps to absorb the high speed motion and reduce the tendency of the gear segment to oscillate. There is also a reaction on the tube itself in this arrangement whereby the original vibration thereof is reduced in amplitude.

Where the gauge is used on a moving vehicle or under other conditions of external vibration, the device may incorporate at the same time the mechanism described in my copending application Serial No. 450,153, filed July 8, 1942, whereby the gear segment or other member is made to turn in an opposite direction to that of the Bourdon tube and be of such mass as to stabilize the moving parts of the gauge under the influence of rotative acceleration.

Figure 1:
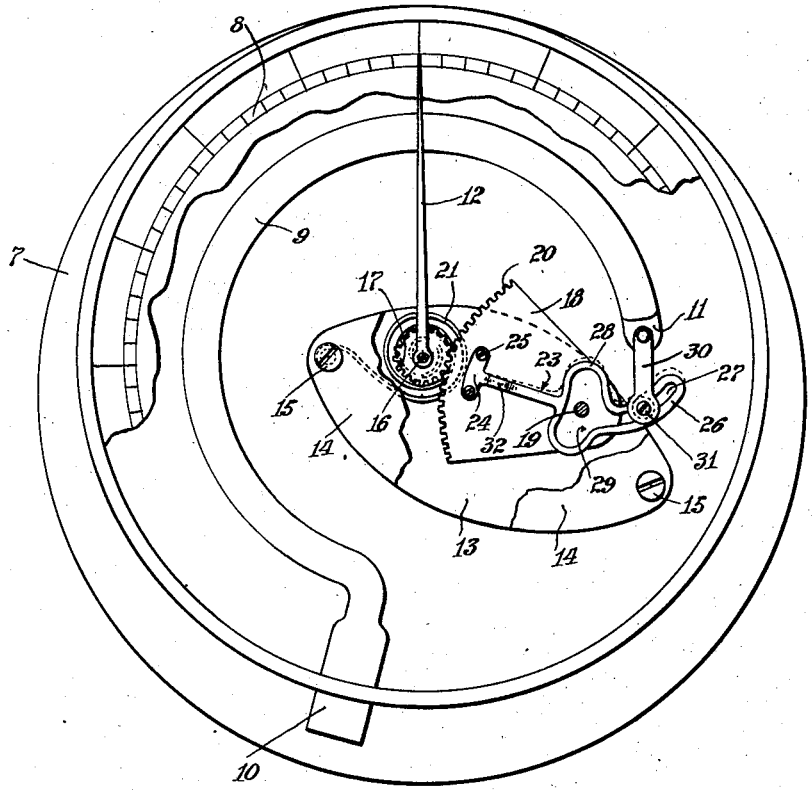
Fig. 1 is a perspective view of a Bourdon type gauge embodying one form of my invention, parts being broken away.
Figure 2:
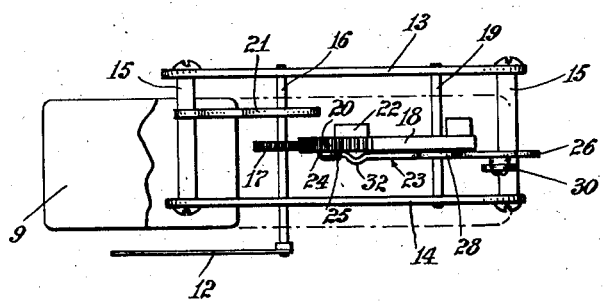
Fig. 2 is a top plan view of the mechanism of Fig. 1 with the casing removed, and parts being broken away.

Referring to Figs. 1 and 2 of the drawings, the gauge comprises an outer casing 7 having a scale 8 at the front. A tube 9 formed preferably of copper and circular or oval in cross section is mounted inside of the casing. This tube has one of its extremities 10 extending through the casing wall. This extremity 10 is connected to a reservoir or other enclosed space (not shown) containing the fluid to be measured by the gauge.

The other extremity 11 of the tube is connected to a needle 12 which traverses the scale 8. The present invention is concerned with the connection between the extremity 11 and the needle 12. In the form of the invention shown in Figs. 1 and 2, a frame comprising rear and front plates 13 and 14, respectively, connected by posts 15, is fastened to the inner surface of the base of the casing in any suitable manner. A shaft 16 is rotatably mounted in the plates 13 and 14 and carries the needle 12 at its front end for movement over the face of the scale 8. A pinion or spur gear 17 is fastened to shaft 16 centrally of the frame. A gear segment 18 is pivotally mounted in the frame by means of a pivot pin 19 and arranged so that it is in line with the pinion 17 and so that the teeth 20 on its outer periphery are in mesh with the teeth of the pinion. A hair spring 21 with one of its ends fastened to one of the posts 15 and its other end to the shaft 16 tends to rotate said shaft in a direction to keep the teeth of pinion 17 pressing against the teeth of the gear segment to prevent back lash. Arcuate weighted members 22 may be carried by the gear segment in order to add inertia thereto when its own inertia is insufficient.

A link member 23 is mounted on the gear segment. This link is irregular in shape and has one end 24 in the shape of a T and fastened to the gear segment near the toothed periphery of said segment as indicated at 25, and to one side of the pivot 19. The other end of the link extends beyond the other side of the pivot 19 and terminates in a substantially arcuate shaped portion 26 having a narrow slot 27. Intermediate its ends, the link is formed to include bowed portions 28 providing an opening through which the pivot pin 19 extends and which opening 29 communicates with the slot 27. The extremity 11 of the tube 9 is connected to this link 23 by a rigid link member 30, one end of which is fastened to the extremity 11 and the other end of which carries a pin 31 which extends into and through the slot 27 in the link 23. The link member 23 is formed of resilient metal such as beryllium copper or steel and is bent as indicated at 32 so as to press the remainder of the link body against the surface of the gear segment and thus create frictional resistance against displacement of the link relative to the gear segment.

Ordinarily when the pressure within the tube increases, the tube changes its form or shape, that is, its curvature diminishes, and the free extremity 11 thereof moves away from the fixed extremity 10 thereby moving the needle or pointer 12 over the scale 8. Movement of extremity 11 is imparted to the pointer by means of the link members 30 and 23, gear segment 18 and pinion 17 as though these parts constituted a single piece pivoted on the pivot pin 19, and a faithful reading follows. However should the tube 9 vibrate either from sudden pressure fluctuation or external forces, the link member 23 flexes against the resistance of the inertia of the gear segment 18 in proportion to the velocity of the motion, the effect of the inertia resistance on the flexure of link member 23 being multiplied by the arrangement because of the reversed transmission path from pivot pin 31 to pivot pin 19. The link member 23 then absorbs the vibration by moving relative to the gear segment as shown by the dotted line in Fig. 1.

The frictional engagement between the link member 23 and the gear segment 18 reduces independent oscillation of the gear segment as the pointer or indicator takes a position approximately half way between the limits of the vibrational motion and therefore registers the mean position of the vibrating tube 9 thus giving a correct pressure reading. There is also a reactionary effect whereby the vibration of the tube itself is reduced due to the resistance of the gear segment acting through the frictional engagement with link member 23. The frictional resistance between the gear segment and link member 23 should be initially adjusted, taking into consideration the inherent rigidity of the link member 23, so as not to leave the link member 23 in any way displaced from normal position relative to the gear segment when the vibration has stopped. A heavy oil or grease may be applied to the parts and where metal to metal frictional contact is to be avoided a renewable piece of fibre, leather or rubber may be inserted between link member 23 and the gear segment at the pressure contact point.

The gear segment need not be heavy in view of the flexibility of the link 23. It is only required that the member 23 be rigid enough to allow faithful indicator following of the normal speed tube motion against friction of the bearings of the moving parts. The inertia of the gear segment is then made to cause a sufficient yielding of the link member 23 at a chosen velocity of motion. Preferably the mass around the pivot point 19 should be balanced relative thereto.

Figure 3:
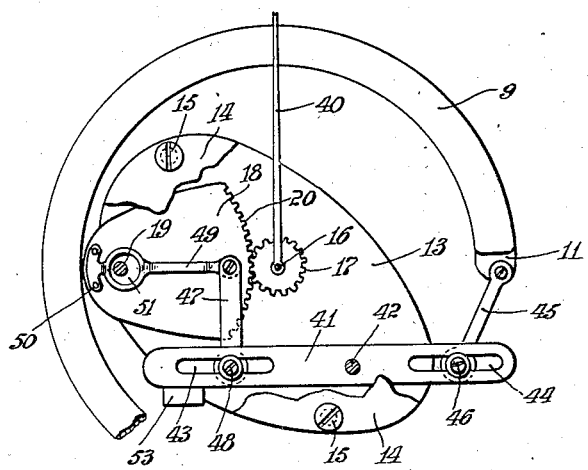
Fig. 3 is a front elevational view of a modified form of moving parts for a Bourdon gauge, parts being broken away.
Figure 4:
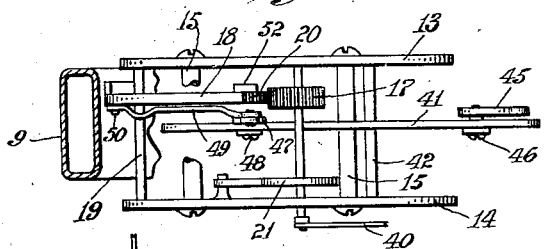
Fig. 4 is a top plan view of the mechanism of Fig. 3, with parts being broken away.

If the required inertia was produced by mounting an inertia disk on the shaft 16, the same result would be secured but the strain of vibration absorption would pass through the gear teeth with consequent wear on the same. In fact it is advantageous to have the gear segment be of sufficient mass and the pinion 17 with the pointer be as light as possible to keep the teeth in light but steady contact at all times, while the vibration is absorbed before reaching this part.

Where the gauge is employed on moving vehicles or under other conditions of external vibration likely to impair the accuracy or steadiness of the reading, the form of the invention shown in Figs. 3 and 4 may be used. In this form the tube 9 is connected to the pointer 40 by mechanism of a different construction including linkage adapted to be actuated by said tube. In this form the pivot pin 19 mounting the gear segment 18 is located adjacent the end of the segment opposite its toothed periphery. The linkage comprises an elongated link member 41 pivoted at 42 and formed with elongated slots 43 and 44 at its ends. The end of said link with slot 44 positioned adjacent the extremity 11 of tube 9 is connected to said extremity by a link 45 having a pin 46 extending into said slot 44 and riding therein. The opposite end of link 41 is connected to the gear segment 18 by a link 47 having a pin 48 riding in its slot 43. This link 47 is pivotally connected to a link 49 having one of its ends fastened to the gear segment at 50 at the edge of said segment opposite its toothed periphery. This link 49 is formed with an opening 51 through which the gear segment pivot pin 19 passes.

The main difference between the two forms is that the gear segments turn in opposite directions. In the form of Figs. 3 and 4, weighted members 52 on the gear segment are arranged to balance the masses moving around pivot pin 19 as a center. At the same time, a weighted member 53 is arranged to balance as much as possible the masses moving around pivot pin 42 as a center. This includes that of the free portion of the tube 9. Under the influence of a rotative acceleration vibration conditions, the mass of the gear segment is such as to oppose with approximately equal force the inertia of the masses moving around pivot pin 42 and also around the shaft 16 with the result of stabilization as described in my copending application aforesaid. Whatever residue of motion is left due to imperfect balancing of the system is easily absorbed by the friction already provided for between the gear segment and the linkage.

Figure 5:
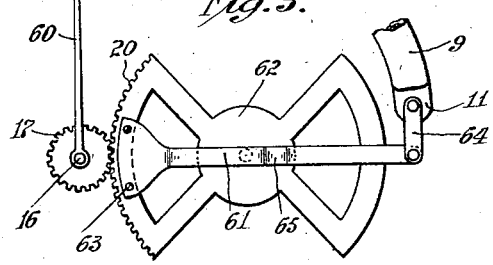
Fig. 5 is a front elevational view of another modified form of moving parts for a Bourdon gauge, parts being broken away.
Figure 6:
Fig. 6 is a top plan view of the mechanism of Fig. 5, with the scale and base plate added.

In the form shown in Figs. 5 and 6, the tube 9 is connected to the pointer 60 by mechanism including an elongated link member 61 secured at one of its ends to the toothed periphery of the gear segment 62 as indicated at 63. The other end of the link 61 is connected to a link 64 which is fastened to the extremity 11 of the tube. The link 61 is bent as indicated at 65 to provide frictional resistance between said link 61 and the gear segment.

I claim:

1. In a pressure gauge, a pressure responsive actuating element, an indicator, a linkage connection between said element and indicator, one of the links of said connection being of such resiliency as to yield to the vibrational component of the motion of the actuating element and being of sufficient rigidity to transmit the normal speed motion of said element faithfully to the indicator, said link having frictional engagement with an associated link whereby self oscillation of the linkage is absorbed.

2. In a pressure gauge, a pressure responsive actuating element, an indicating member, a linkage connection between the actuating element and the indicating member, a semi-resilient link in the linkage connection having frictional engagement intermediate of its length with an associated link whereby resilient motion of said link due to high speed motion of the actuating element is subjected to damping absorption.

3. In a pressure gauge, a pressure responsive actuating element, an indicating member, a linkage connection between the actuating element and the indicating member including a gear segment, one of the links of said connection being resilient and being fastened to the gear segment and frictionally engaging the segment beyond its point of attachment for dampening the resilient motion of said link.

4. In a pressure gauge, a pressure responsive actuating element, an indicator, a linkage connection between the actuating element and indicator including a pivoted member one of the links of said connection being resilient and being fastened at one end thereof to said pivoted member, the path from the point of applied motion on said latter link to the fastening point proceeding in a different direction than that of the path from the fastening point to the pivot of said pivoted member, said resilient link frictionally engaging said pivoted member whereby self oscillation of the gauge mechanism is absorbed.

5. In a pressure gauge, a pressure responsive actuating element, an indicator, a linkage connection between the actuating element and the indicator including a pivoted gear segment, one of the links of said connection being resilient and being fastened to the gear segment at one side of the pivot at one of its ends and motion being imparted to said link by said actuating element at the other side of said pivot, said resilient link frictionally engaging said pivoted member whereby self oscillation of the gauge mechanism is absorbed.

6. In a pressure gauge, a Bourdon tube, a rigid link member having one end fastened to said tube, an elongated resilient link member and a pivoted segment lever, a slot and stud connection between one end of said resilient link member and said rigid link member at a point on one side of the pivot point of said segment lever and a rigid connection between the other end of said resilient link member and said segment lever at a point on the other side of said pivot, said resilient lever frictionally engaging said segment lever beyond the point of attachment to said segment lever for dampening the motion of said resilient link.

LEON DEWAN.